UNITED STATES PATENT OFFICE.

JÜRGEN CALLSEN, OF ELBERFELD, AND RICHARD STÜSSER, OF DENTZ, GERMANY, ASSIGNORS TO SYNTHETIC PATENTS CO., INC., OF NEW YORK, N. Y., A CORPORATION OF NEW YORK.

CAMPHOR COMPOUNDS.

1,169,316.     Specification of Letters Patent.     Patented Jan. 25, 1916.

No Drawing.     Application filed December 29, 1914. Serial No. 879,539.

*To all whom it may concern:*

Be it known that we, JÜRGEN CALLSEN and RICHARD STÜSSER, doctors of philosophy, chemists, citizens of the German Empire, residing at, respectively, Elberfeld and Dentz, near Cologne, Germany, have invented new and useful Improvements in Camphor Compounds, of which the following is a specification.

We have found that a new nor-camphor being a valuable substitute for camphor can be obtained by heating ketopinic acid in an acid medium. The reaction proceeds most probably in accordance with the following equation:

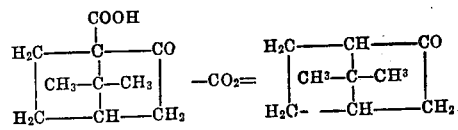

In order to illustrate the new process more fully the following example is given, the parts being by weight:—10 parts of ketopinic acid are heated to boiling together with a mixture of 180 parts of sulfuric acid (66° Bé.) and 120 parts of water while introducing into the reaction mass steam heated to 140° C., taking care that the temperature in the boiling liquid is always 137–140° C. The water which distils over contains the new compound. The distillate is rendered alkaline by the addition of sodium carbonate, it is shaken with ether, the ethereal solution dried, the ether is distilled off and the residue is distilled *in vacuo*. The resulting nor-camphor $C_9H_{14}O$ contains only 2 asymmetric carbon atoms and is an oil boiling at 105° C. under a pressure of 13 mm. Its semicarbazone $C_{10}H_{17}N_3O$ crystallizes from dilute alcohol in the shape of white leaflets melting at about 167° C. with decomposition. Another acid agent, such as phosphoric acid, boric acid, can be used. On using phosphoric acid besides the new nor camphor another product was obtained probably a condensation product of the new nor-camphor by condensation of two molecules of it with separation of one molecule of water and being most probably an ether of our new nor-camphor. It distils at 39° C. under a pressure of 13 mm. Instead of ketopinic acid a derivative of it *e. g.* bromoketopinic acid can be used a new bromo-nor-camphor being obtained.

Our new preparations possess the valuable property of furnishing solutions with salt solutions, *e. g.* of oxy-carboxylic acids, which can be used for subcutaneous injections when it is desired to excite the activity of the heart and of respiration. For each injection .1 to .2 grams are employed. For this purpose *e. g.* 3 parts of our new nor-camphor are mixed with 35 parts of a 50 per cent. solution of sodium salicylate. A limpid solution is thus obtained which can be diluted with water. Instead of a salicylate *e. g.* an aqueous solution of the sodium salt of meta-oxybenzoic acid or sodium benzoate can be used.

We claim:—

1. The new products being chemically nor-camphors obtainable by decomposition of ketopinic acid compounds, which are generally oils forming semicarbazones, yielding solutions suitable for subcutaneous injection with salt solutions, substantially as described.

2. The new products being chemically nor-camphors containing only two asymmetric carbon atoms, forming semicarbazones, and yielding solutions suitable for subcutaneous injection with salt solutions, substantially as described.

3. The new product being chemically a nor-camphor $C_9H_{14}O$ and being an oil boiling at 105° C. under a pressure of 13 mm., yielding a semicarbazone $C_{10}H_{17}N_3O$ melting at 167° C. and forming with sodium salicylate solution a liquid suitable for subcutaneous use, substantially as described.

In testimony whereof we have hereunto set our hands in the presence of two subscribing witnesses.

JÜRGEN CALLSEN, [L. S.]
    RICHARD STÜSSER. [L. S.]

Witnesses:
  HELEN NUFER,
  ALBERT NUFER.